US012710274B2

(12) United States Patent
Sakano et al.

(10) Patent No.: US 12,710,274 B2
(45) Date of Patent: Aug. 18, 2026

(54) ON-BOARD PROCESSING DEVICE, VEHICLE CONTROL DEVICE, AND SELF-POSITION ESTIMATION METHOD

(71) Applicant: Hitachi Astemo, Ltd., Hitachinaka (JP)

(72) Inventors: Morihiko Sakano, Tokyo (JP); Hideyuki Kume, Ibaraki (JP); Shigenori Hayase, Ibaraki (JP); Tatsuhiko Monji, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 171 days.

(21) Appl. No.: 18/293,878

(22) PCT Filed: Jan. 25, 2022

(86) PCT No.: PCT/JP2022/002692
§ 371 (c)(1),
(2) Date: Jan. 31, 2024

(87) PCT Pub. No.: WO2023/037570
PCT Pub. Date: Mar. 16, 2023

(65) Prior Publication Data

US 2024/0344830 A1 Oct. 17, 2024

(30) Foreign Application Priority Data

Sep. 9, 2021 (JP) ................................ 2021-146844

(51) Int. Cl.
*G01C 21/30* (2006.01)
*B60W 10/04* (2006.01)
(Continued)

(52) U.S. Cl.
CPC ............ *G01C 21/30* (2013.01); *B60W 10/04* (2013.01); *B60W 10/18* (2013.01); *B60W 10/20* (2013.01);
(Continued)

(58) Field of Classification Search
CPC .............................. G01C 21/30; B60W 10/04
See application file for complete search history.

(56) References Cited

U.S. PATENT DOCUMENTS 8,174,568 B2 * 5/2012 Samarasekera ...... G01C 21/005 701/28
9,746,331 B1 * 8/2017 Yu .......................... G01S 19/42
(Continued)

FOREIGN PATENT DOCUMENTS

JP 2007-322351 A 12/2007
JP 2018-128314 A 8/2018
(Continued)

OTHER PUBLICATIONS

International Search Report with English Translation of International Patent Application No. PCT/JP2022/002692 dated Mar. 8, 2022.

(Continued)

*Primary Examiner* — Jess Whittington
(74) *Attorney, Agent, or Firm* — Foley & Lardner LLP

(57) ABSTRACT

An on-board processing device includes: a past map storage unit that stores a past generated map generated in the past; a self-map generation unit that generates a traveling map on the basis of sensor data acquired while traveling; a self-position estimation unit that estimates a self-position by collating the past generated map and the traveling map; and a data selection unit that selects data, to be used by the self-position estimation unit, from the traveling map on the basis of characteristics of data included in the traveling map.

9 Claims, 9 Drawing Sheets

(51) Int. Cl.
*B60W 10/18* (2012.01)
*B60W 10/20* (2006.01)

(52) U.S. Cl.
CPC ..... *B60W 2556/40* (2020.02); *B60W 2556/50* (2020.02)

(56) References Cited

U.S. PATENT DOCUMENTS

2011/0208496 A1* 8/2011 Bando ..................... G01S 5/018 703/2
2012/0296566 A1* 11/2012 Ban ......................... G01S 19/49 701/445
2018/0024562 A1* 1/2018 Bellaiche ................ B60R 1/025 701/26
2018/0225524 A1 8/2018 Fujita
2020/0019792 A1* 1/2020 Sano ......................... G06T 7/70
2020/0098189 A1* 3/2020 Pavloff ................. G06T 19/006
2021/0190509 A1* 6/2021 Tagawa .................. G01C 21/30
2022/0197296 A1* 6/2022 Suzuki ................. G05D 1/0274

FOREIGN PATENT DOCUMENTS

JP 2019-144041 A 8/2019
JP 2020-060496 A 4/2020
JP 2021-099280 A 7/2021
WO WO-2018/061084 A1 4/2018

OTHER PUBLICATIONS

Japanese Office Action issued in corresponding JP Patent Application No. 2021-146844, dated Feb. 25, 2025 with English translation (8 pages).

* cited by examiner

*FIG. 3*
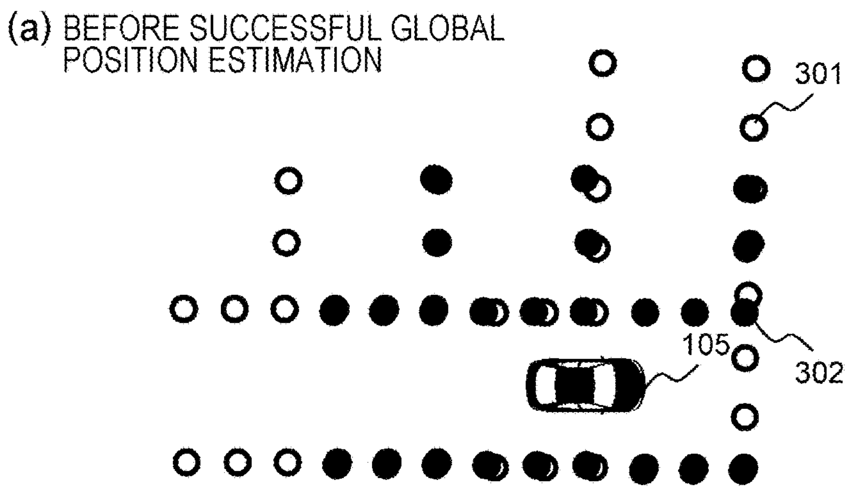
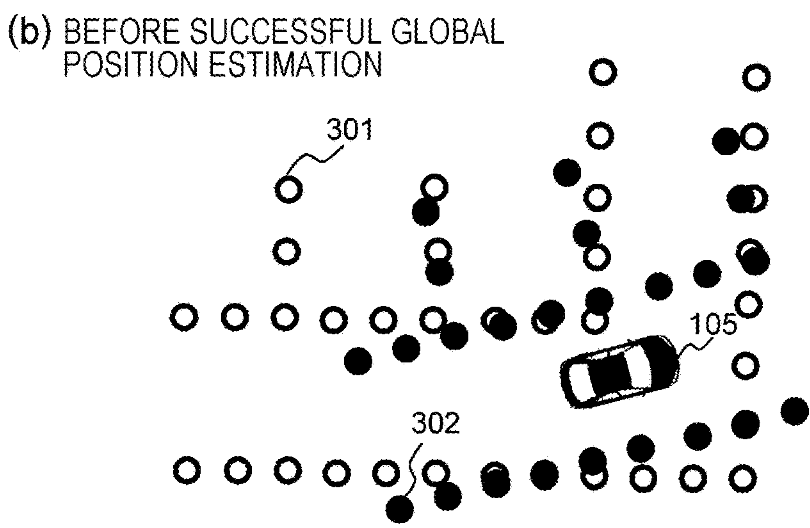
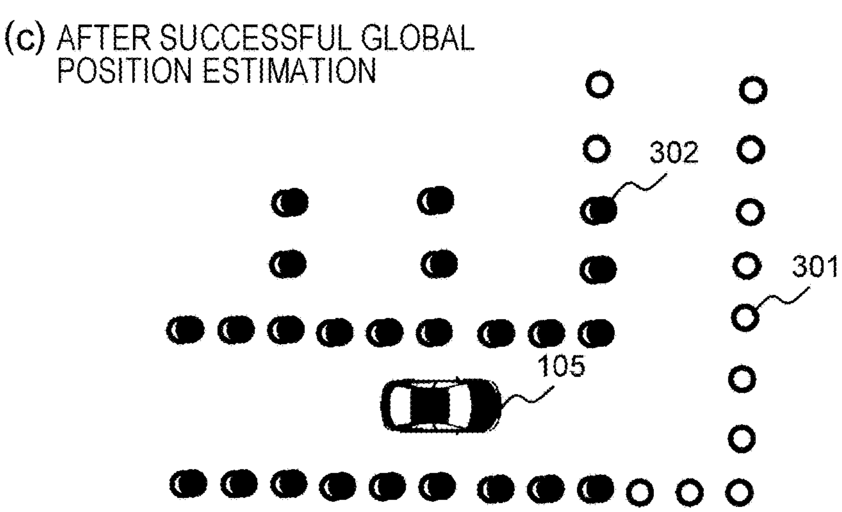

| STEREO CAMERA | BEFORE GLOBAL POSITION ESTIMATION | AFTER GLOBAL POSITION ESTIMATION |
|---|---|---|
| SMALL TRAVEL TRAJECTORY DIFFERENCE | NEAR/MIDDLE/FAR HIGH POINT GROUP NEAR/MIDDLE/FAR ROAD SURFACE POINT GROUP | NEAR HIGH POINT GROUP NEAR ROAD SURFACE POINT GROUP |
| LARGE TRAVEL TRAJECTORY DIFFERENCE | NEAR/MIDDLE HIGH POINT GROUP, NEAR/MIDDLE ROAD SURFACE POINT GROUP | NEAR ROAD SURFACE POINT GROUP |

(b)

| CAMERA | BEFORE GLOBAL POSITION ESTIMATION | AFTER GLOBAL POSITION ESTIMATION |
|---|---|---|
| LOW SPEED | HIGH POINT GROUP, ROAD SURFACE POINT GROUP | ROAD SURFACE POINT GROUP |
| HIGH SPEED | ROAD SURFACE POINT GROUP | ROAD SURFACE POINT GROUP |

(c)

| SONAR | BEFORE GLOBAL POSITION ESTIMATION | AFTER GLOBAL POSITION ESTIMATION |
|---|---|---|
| SMALL SPEED DIFFERENCE | POINT, LINE | POINT, LINE |
| LARGE SPEED DIFFERENCE | LINE | LINE |

(d)

| SONAR | BEFORE GLOBAL POSITION ESTIMATION | AFTER GLOBAL POSITION ESTIMATION |
|---|---|---|
| SMALL TEMPERATURE DIFFERENCE | POINT, LINE | POINT, LINE |
| LARGE TEMPERATURE DIFFERENCE | – | – |

| | BEFORE GLOBAL POSITION ESTIMATION | AFTER GLOBAL POSITION ESTIMATION |
|---|---|---|
| STEREO CAMERA | NEAR/MIDDLE/FAR HIGH POINT GROUP NEAR/MIDDLE/FAR ROAD SURFACE POINT GROUP | NEAR ROAD SURFACE POINT GROUP |

(b)

| | BEFORE GLOBAL POSITION ESTIMATION | AFTER GLOBAL POSITION ESTIMATION |
|---|---|---|
| CAMERA | HIGH POINT GROUP, ROAD SURFACE POINT GROUP | ROAD SURFACE POINT GROUP |

(c)

| | BEFORE GLOBAL POSITION ESTIMATION | AFTER GLOBAL POSITION ESTIMATION |
|---|---|---|
| SONAR | POINT, LINE | LINE |

FIG. 7

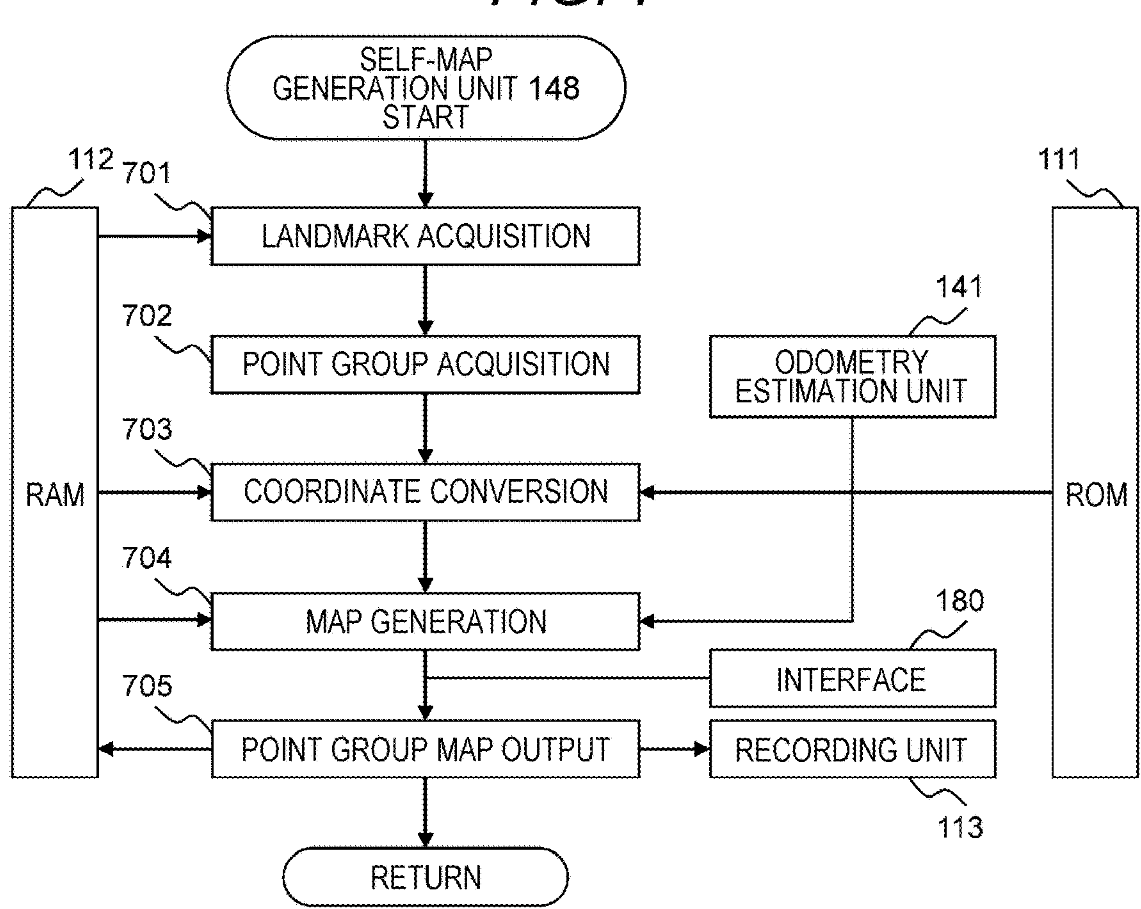

ON-BOARD PROCESSING DEVICE, VEHICLE CONTROL DEVICE, AND SELF-POSITION ESTIMATION METHOD

INCORPORATION BY REFERENCE

This application claims priority to Japanese Patent Application No. 2021-146844 filed on Sep. 9, 2021 (2021), the contents of which are incorporated herein by reference.

TECHNICAL FIELD

The present invention relates to an on-board processing device which generates a map from an observation result of a sensor and estimates a self-position.

BACKGROUND ART

Detailed map information for estimating the self-position is important in application of an autonomous driving system and a driving support system. However, for an expressway, a detailed map for the driving support system is being prepared, but the preparation of a detailed map for a residential area such as a general road or a neighborhood of a house has not been made. In order to expand the application range of the autonomous driving system and the driving support system, a technique capable of generating a map by itself and estimating the self-position is required.

The background art of the present technical field includes the following prior art. PTL 1 (JP 2019-144041 A) describes a self-position estimation device including: a first acquisition unit which acquires an external status signal indicating a status outside a mobile body; a second acquisition unit which acquires map data including information indicating a feature affected by weather; a third acquisition unit which acquires weather information indicating a weather state; and a self-position estimation unit which estimates a self-position of the mobile body on the basis of the external status signal, in which the self-position estimation unit evaluates accuracy of the external status signal on the basis of the map data and the weather information.

SUMMARY OF INVENTION

Technical Problem

In the invention described in PTL 1, the self-position is estimated on the basis of the weather information in consideration of the reliability of an observation point group, thereby enabling highly accurate self-position estimation. However, since the regarding the observation accuracy of a camera point group or the occurrence of local adaptation at the time of position estimation by the camera point group is not considered, there are problems that the self-position estimation is incorrect or the self-position estimation accuracy is low. When the self-position estimation accuracy is low, it is difficult to utilize the self-position estimation for autonomous driving and driving support.

In this regard, an object of the present invention is to select an optimal point group and estimate a self-position with high accuracy in consideration of a property regarding an observation accuracy of the point group.

Solution to Problem

A typical example of the invention disclosed in this application is as follows. That is, an on-board processing device includes: a past map storage unit that stores a past generated map generated in the past; a self-map generation unit that generates a traveling map on the basis of sensor data acquired while traveling; a self-position estimation unit that estimates a self-position by collating the past generated map and the traveling map; and a data selection unit that selects data, to be used by the self-position estimation unit, from the traveling map on the basis of characteristics of data included in the traveling map.

Advantageous Effects of Invention

According to one aspect of the present invention, the self-position can be estimated with high accuracy. Problems, configurations, and effects other than those described above will become apparent from the description of the following embodiments.

BRIEF DESCRIPTION OF DRAWINGS

FIG. 3 is a diagram illustrating global position estimation and local position estimation.

FIG. 5 is a diagram illustrating an example of determination elements of an integrated determination unit.

FIG. 6 is a diagram illustrating an example of determination elements of an integrated diagnosis unit.

FIG. 7 is a flowchart illustrating an operation of a self-map generation unit.

DESCRIPTION OF EMBODIMENTS

Hereinafter, an embodiment of a map generation/self-position estimation device 100 according to the present invention will be described with reference to FIGS. 1 to 9.

First Embodiment

Figure 1:
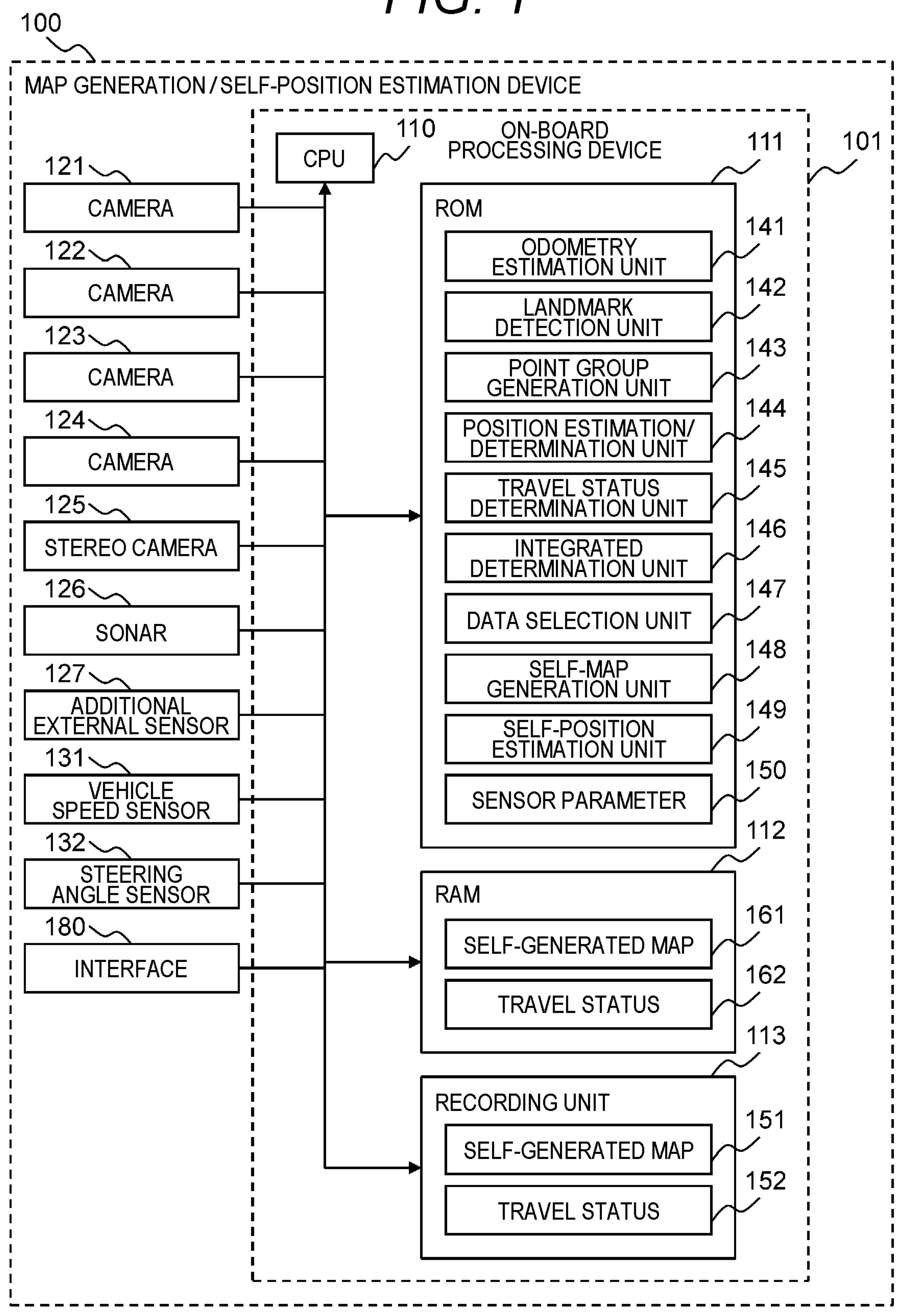
FIG. 1 is a block diagram illustrating a configuration of a map generation/self-position estimation device according to a first embodiment.

FIG. 1 is a block diagram illustrating a configuration of the map generation/self-position estimation device 100 according to a first embodiment of the present invention.

The map generation/self-position estimation device 100 is mounted on a vehicle 105, and includes cameras 121 to 124, a stereo camera 125, a sonar 126, an additional external sensor 127, a vehicle speed sensor 131, a steering angle sensor 132, an interface 180, and an on-board processing device 101. The cameras 121 to 124, the stereo camera 125, the sonar 126, the additional external sensor 127, the vehicle speed sensor 131, the steering angle sensor 132, and the interface 180 are connected to the on-board processing device 101 via signal lines, and exchange various types of data with the on-board processing device 101.

The on-board processing device 101 includes a CPU 110, a ROM 111, a RAM 112, and a recording unit 113. All or part of computing processing may be executed by another computing processing device such as an FPGA.

The CPU 110 is a computing device which reads and executes various programs and parameters from the ROM 111, and operates as an execution unit of the on-board processing device 101.

The RAM 112 is a readable/writable storage area, and operates as a main storage device of the on-board processing device 101. The RAM 112 stores a self-generated map 161 and a travel status 162 to be described later.

The ROM 111 is a read-only storage area and stores a program to be described later. This program is developed in the RAM 112 and executed by the CPU 110. The CPU 110 reads and executes the program to operate as an odometry estimation unit 141, a landmark detection unit 142, a point group generation unit 143, a position estimation/determination unit 144, a travel status diagnosis unit 145, an integrated determination unit 146, an integrated diagnosis unit 140, a data selection unit 147, a self-map generation unit 148, and a self-position estimation unit 149. In addition, the ROM 111 also stores a sensor parameter 150. For each of the cameras 121 to 124, the stereo camera 125, the sonar 126, and the additional external sensor 127, the sensor parameter 150 includes a positional and postural relationship with the vehicle 105 and information unique to each sensor. For example, the sensor parameters 150 of the cameras 121 to 124 and the stereo camera 125 include a lens distortion coefficient, an optical axis center, a focal length, the number of pixels of the imaging element, and dimensions, and the sensor parameter 150 of the additional external sensor 127 includes information unique to each sensor.

The recording unit 113 is a nonvolatile storage device, and operates as an auxiliary storage device of the on-board processing device 101. The recording unit 113 stores a self-generated map 151 and a travel status 152.

The cameras 121 to 124 are attached around the vehicle 105, for example, and capture an image of the surroundings of the vehicle 105. The positional and postural relationship between the cameras 121 to 124 and the vehicle 105 is stored as the sensor parameter 150 in the ROM 111. A method of attaching the cameras 121 to 124 is not limited to the above-described method, and other attaching methods may be used. In addition, the number of cameras 121 to 124 is not necessarily four.

The stereo camera 125 is attached to, for example, the inside of the windshield in the vehicle compartment of the vehicle 105, and captures an image of the front of the vehicle 105. The positional and postural relationship between the stereo camera 125 and the vehicle 105 is stored as the sensor parameter 150 in the ROM 111. A method of attaching the stereo camera 125 is not limited to the above-described method, and other attaching methods may be used. The stereo camera 125 may be one unit in which two cameras are separated by a predetermined base length and arranged laterally side by side, may be one in which two cameras in the state of being attached roughly can be utilized as a stereo camera by calibration, may be one in which two cameras are configured vertically side by side, or may be one in which three or more cameras are arranged side by side. In the present embodiment, a stereo camera in which two cameras are separated by the predetermined base length and arranged laterally side by side into one unit is assumed and described. The stereo camera 125 outputs an image obtained by photographing and parallax necessary for distance calculation to the on-board processing device 101. The stereo camera 125 may output only a captured image to the on-board processing device 101, and the CPU 110 may calculate the parallax.

A plurality of sonars 126 are mounted on the vehicle 105, for example, and observe the surroundings of the vehicle 105. The positional and postural relationship between the sonar 126 and the vehicle 105 is stored as the sensor parameter 150 in the ROM 111.

The additional external sensor 127 is, for example, a LiDAR mounted on the vehicle 105, and observes the surroundings of the vehicle 105. The positional and postural relationship between the additional external sensor 127 and the vehicle 105 is stored as the sensor parameter 150 in the ROM 111.

The cameras 121 to 124 and the stereo camera 125 each include a lens and an imaging element. The sensor parameter 150 includes characteristics of these cameras 121 to 124 and 125, for example, a lens distortion coefficient which is a parameter indicating lens distortion, an optical axis center, a focal length, internal parameters such as the number of pixels and dimensions of the imaging element, a positional and postural relationship indicating an attachment state of the sensor to the vehicle 105, a relative relationship between two cameras of the stereo camera 125, and information unique to each of the sonar 126 and the additional external sensor 127, and is stored in the ROM 111. The positional and postural relationship between each of the cameras 121 to 124, the stereo camera 125, the sonar 126, and the additional external sensor 127 and the vehicle 105 may be estimated by the CPU 110 using the captured image, the parallax, the vehicle speed sensor 131, and the steering angle sensor 132 in the on-board processing device 101.

The cameras 121 to 124, the stereo camera 125, the sonar 126, and the additional external sensor 127 may be mounted in various numbers or combinations as long as at least any one of the cameras 121 to 124 and the stereo camera 125 is included.

Each of the vehicle speed sensor 131 and the steering angle sensor 132 measures the vehicle speed and the steering angle of the vehicle 105 on which the on-board processing device 101 is mounted, and outputs the vehicle speed and the steering angle to the on-board processing device 101. By using the outputs of the vehicle speed sensor 131 and the steering angle sensor 132, with a known dead reckoning technique, the on-board processing device 101 calculates the movement amount and the movement direction of the vehicle 105 on which the on-board processing device 101 is mounted.

The interface 180 provides, for example, a GUI which receives an instruction input from a user. In addition, other information may be input and output in other forms.

Figure 2:
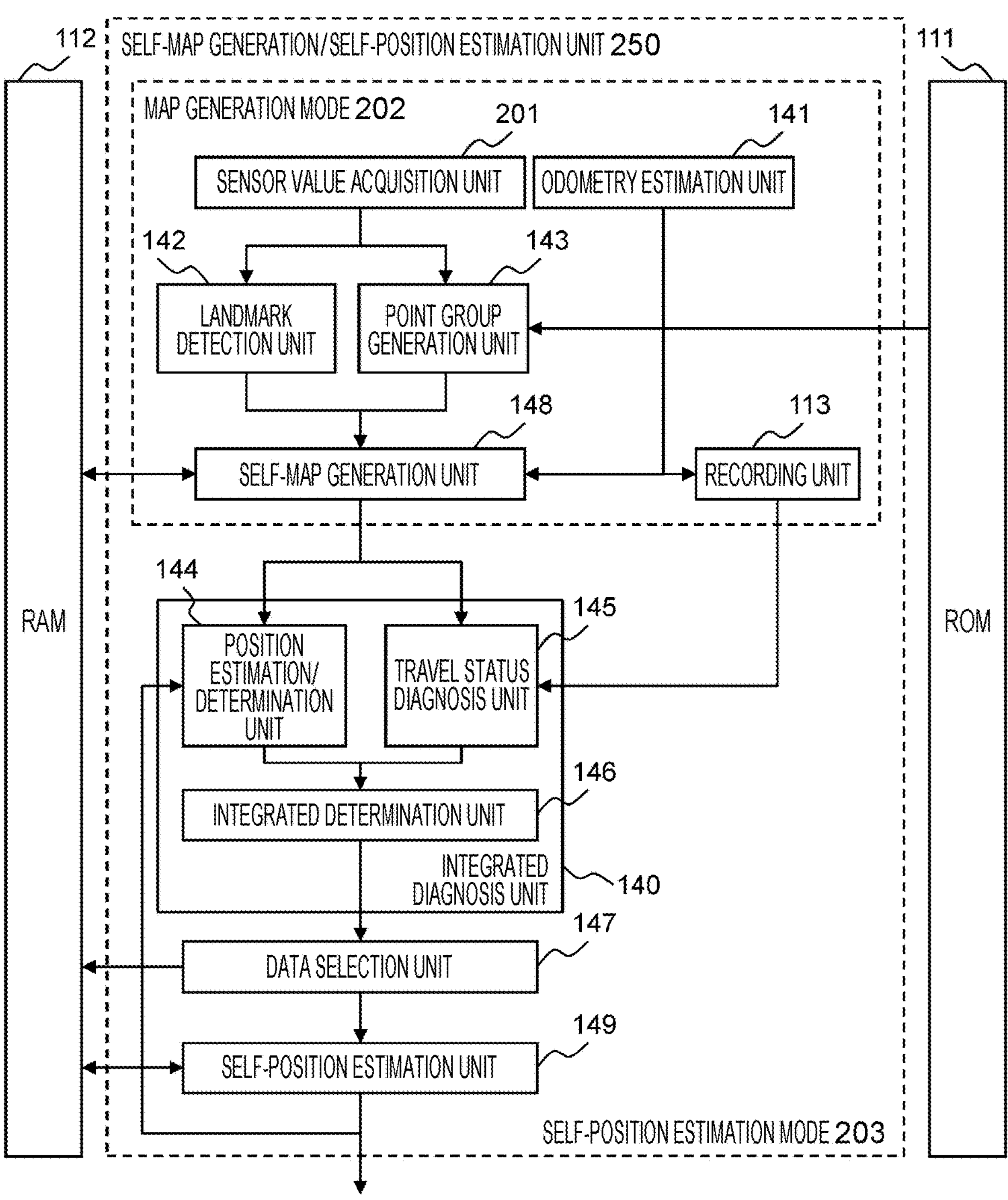
FIG. 2 is a functional block diagram illustrating an operation of the map generation/self-position estimation device.

FIG. 2 is a functional block diagram illustrating an operation of the map generation/self-position estimation device 100, and illustrates a flow of data among functional blocks executed by the CPU 110, the RAM 112, the ROM 111, and the recording unit 113. In FIG. 2, the functions of the odometry estimation unit 141, the landmark detection unit 142, the point group generation unit 143, the integrated diagnosis unit 140, the data selection unit 147, the self-map generation unit 148, and the self-position estimation unit 149 are illustrated as functional blocks.

A self-map generation/self-position estimation unit 250 includes a sensor value acquisition unit 201, the odometry estimation unit 141, the landmark detection unit 142, the point group generation unit 143, the integrated diagnosis unit 140, the data selection unit 147, the self-map generation unit 148, the self-position estimation unit 149, and the recording unit 113. The integrated diagnosis unit 140 includes the position estimation/determination unit 144, the travel status diagnosis unit 145, and the integrated determination unit 146.

In the self-map generation/self-position estimation unit 250, a combination of the sensor value acquisition unit 201, the odometry estimation unit 141, the landmark detection unit 142, the point group generation unit 143, the self-map generation unit 148, and the recording unit 113 operates in a map generation mode 202, and a combination of the sensor value acquisition unit 201, the odometry estimation unit 141, the landmark detection unit 142, the point group generation unit 143, the integrated diagnosis unit 140, the data selection unit 147, the self-map generation unit 148, the self-position estimation unit 149, and the recording unit 113 operates in a self-position estimation mode 203.

In the map generation mode 202, a point group map is generated from the own observation result. In the map generation mode 202, the sensor information observed at each time by the sensor value acquisition unit 201, the landmark detection unit 142, the point group generation unit 143, the odometry estimation unit 141, the self-map generation unit 148, and the recording unit 113 is combined in time series in consideration of vehicle motion, so as to self-generate the point group map. Details of each functional block will be described later. In the map generation mode 202, after the point group map is recorded as the self-generated map 151 in the recording unit 113, the functional blocks related to the self-position estimation in the subsequent stage are not executed.

In the self-position estimation mode 203, the self-generated map 151 is read from the recording unit 113, and the self-position is estimated on the self-generated map 151. In the self-position estimation unit 149, the map recorded in the recording unit 113 in the past, and, similarly to the map generation mode 202, the sensor information observed at each time by the sensor value acquisition unit 201, the landmark detection unit 142, the point group generation unit 143, the odometry estimation unit t 141, the self-map generation unit 148, and the recording unit 113 are combined in time series in consideration of the vehicle motion, and the self-generated point group map is collated, so as to estimate the self-position. Details of each functional block will be described later.

The sensor value acquisition unit 201 acquires a signal output from the sensor. An image is acquired from the cameras 121 to 124, and an image and parallax are acquired from the stereo camera 125. The cameras 121 to 124 and the stereo camera 125 perform photographing continuously at a high frequency, for example, 30 times per second. The sonar 126 and the additional external sensor 127 output observation results at a frequency determined by each sensor. The sensor value acquisition unit 201 receives these images and signals at a predetermined frequency, and outputs the received images and signals to the landmark detection unit 142 and the point group generation unit 143. The subsequent processing, that is, each of the functional blocks 142 to 149 may operate each time the observation result is received, but may operate at a predetermined cycle.

The odometry estimation unit 141 estimates the motion of the vehicle 105 by using the speed and the steering angle of the vehicle 105 transmitted from the vehicle speed sensor 131 and the steering angle sensor 132. For example, estimation may be performed by using known dead reckoning, estimation may be performed by using a known visual odometry technique using a camera, or estimation may be performed using a known Kalman filter or the like in combination. The vehicle speed, the steering angle, the vehicle motion information, the vehicle motion trajectory (odometry) obtained by integrating the vehicle motion, and the like are stored as the travel status 162 in the recording unit 113 and output to the self-map generation unit 148. Note that the position data based on a GNSS may be input to the odometry estimation unit 141, and the odometry based on absolute coordinates estimated from the vehicle speed, the steering angle, and the position data may be output from the odometry estimation unit 141. In this case, a map closest to the current position can be selected from a plurality of maps, or information obtained by combining the generated map and the actual map can be referred to.

The landmark detection unit 142 first detects a landmark on a road surface by using the images input from the cameras 121 to 124 and the stereo camera 125 and acquired by the sensor value acquisition unit 201. The landmark on the road surface is a feature on the road surface having a feature identifiable by a sensor, and is, for example, a lane mark which is a type of road marking paint, a stop line, a crosswalk, other regulation display, or the like. In the present embodiment, a vehicle or a human which is a mobile body, a wall of a building which is an obstacle which hinders traveling of the vehicle, or the like is not treated as the landmark on the road surface.

The landmark detection unit 142 detects a landmark on a road surface present around the vehicle 105, that is, a feature on the road surface identifiable by a sensor, on the basis of information input from the cameras 121 to 124 and the stereo camera 125. The information of the landmark may be obtained in units of pixels, or may be obtained as an object in which pixels are grouped. The type (for example, a lane mark, a crosswalk, or the like) of the landmark may or may not be identified by the image recognition.

Next, the landmark detection unit 142 generates a point group representing the landmark on the road surface, on the basis of the obtained landmark information. This point group may be two-dimensional or three-dimensional, but will be described as a three-dimensional point group in the present embodiment.

For example, by using the information regarding the cameras 121 to 124 included in the sensor parameter 150, a distance to the road surface in each pixel in the image acquired from the cameras 121 to 124 can be calculated with relatively high accuracy, and three-dimensional coordinates can be calculated from the calculated distance. By using the calculated three-dimensional coordinates, the point group data representing three-dimensional coordinates of the pixel having the landmark or the grouped object is output to the self-map generation unit 148.

In addition, for example, the distance can be calculated from the parallax value acquired by the stereo camera 125 and the sensor parameter 150 by the principle of triangulation. Furthermore, the three-dimensional coordinates of the target appearing in the corresponding pixel can be calculated from the calculated distance. In the present embodiment, in order to output a highly accurate three-dimensional point group, a Uniqueness Ratio, which is a parameter at the time of parallax calculation by stereo matching, is adjusted in advance, so as to output a highly accurate parallax value. Highly accurate three-dimensional coordinates are calculated by using the output highly accurate parallax value, and the calculated three-dimensional coordinates are used to output, to the self-map generation unit 148, the point group data representing three-dimensional coordinates of the pixel having the road surface landmark or the grouped object.

Hereinafter, the point group data obtained by the landmark detection unit 142 is referred to as a road surface point group in order to be distinguished from a point group to be described later. In addition, similarly to observation values in each sensor coordinate system, three-dimensional coordinates are represented by relative coordinate values from the sensors.

The point group generation unit 143 generates a point group representing a landmark, which has a height, such as a wall of a building by using the image and the sensor information acquired by the sensor value acquisition unit 201. This point group may be two-dimensional or three-dimensional, and will be described as a three-dimensional point group in the present embodiment.

For example, the three-dimensional coordinates can be calculated from the images acquired by the cameras 121 to 124 by using a known motion stereo method. In the motion stereo method, attitude variations of a camera are measured by measuring time-series movements of feature points, which are characteristic points of an image, such as corners of an object, and three-dimensional coordinates are calculated by the principle of triangulation. In the calculation of three-dimensional coordinates by the motion stereo method, it is difficult to perform calculation with high accuracy for an arbitrary pixel, and only points which are easily tracked as feature points can be calculated with high accuracy. The points which are easily tracked as feature points can be selected by a known technique. Three-dimensional coordinates of the points which are easily tracked as feature points are measured, and points higher than the road surface are output as a point group to the self-map generation unit 148.

In addition, for example, in the case of the stereo camera 125, as described above, a distance can be measured by the principle of triangulation from the parallax value and the sensor parameter 150 stored in the ROM 111. Furthermore, the three-dimensional coordinates of the target appearing in the corresponding pixel can be measured from the distance information. Similarly to the above, in order to output a highly accurate three-dimensional point group, a Uniqueness Ratio, which is a parameter at the time of parallax calculation by stereo matching, is adjusted in advance, so as to output a highly accurate parallax value. Three-dimensional coordinates are calculated by using the highly accurate parallax value, and a point group at a position higher than the road surface is output to the self-map generation unit 148.

In addition, for example, the sonar 126 is a sensor which directly observes a point group and is assumed to be attached so as not to observe a road surface, and thus all the acquired point groups are output as point groups to the self-map generation unit 148. Among the acquired point groups, the points arranged in a linear manner are grouped and interpolated with a linear point group so as to have a predetermined interval, and output. In addition, a label indicating that a linear point group is formed is assigned.

In addition, for example, the additional external sensor 127 is a sensor which directly observes a point group, and outputs a point group, which is at a position higher than the road surface, among the acquired point groups to the self-map generation unit 148.

The point group data obtained by the point group generation unit 143 is referred to as a high point group in order to be distinguished from the road surface point group described above. In a case where the road surface point group and the high point group based on the observation of the cameras 121 to 124 and the stereo camera 125 are compared with each other, there is a feature indicating that the road surface point group has higher accuracy when the observation distance is the same. In addition, similarly to observation values in each sensor coordinate system, the three-dimensional coordinates are represented by relative coordinate values from the sensors.

The self-map generation unit 148 converts the point group information, which is obtained from both the landmark detection unit 142 and the point group generation unit 143 and represented by the relative coordinate values of the sensor, into world coordinates by using the vehicle motion information of the travel status 162 obtained from the odometry estimation unit 141 and the sensor parameter 150 stored in the ROM 111, and generates a point group map by combining the converted point group information in time series. The world coordinate value is a coordinate value based on a certain coordinate and a certain axis. For example, a position at which the on-board processing device 101 is started may be defined as an origin, a direction in which the on-board processing device travels first may be defined as an X axis, and a direction orthogonal to the X axis may be defined as a Y axis and a Z axis.

The map obtained by the self-map generation unit 148 is stored as the self-generated map 161 in the RAM 112. After the next time, the self-generated map 161 is read from the RAM 112, the point groups newly obtained from the landmark detection unit 142 and the point group generation unit 143 are coordinate-converted, and combined in time series by using the motion information of an own vehicle.

In the map generation mode 202, the processing ends in the self-map generation unit 148, and input of the next time is awaited. In the self-position estimation mode 203, the self-map generation unit 148 outputs the self-generated map 161 and the travel status 162 to the position estimation/determination unit 144 and the travel status diagnosis unit 145. When there is an instruction of map recording via the interface 180, the generated self-generated map and travel status are recorded as the self-generated map 151 and the travel status 152 in the recording unit 113. A processing flow of the self-map generation unit 148 will be described later with reference to FIG. 7.

The integrated diagnosis unit 140 includes the position estimation/determination unit 144, the travel status diagnosis unit 145, and the integrated determination unit 146. The integrated diagnosis unit 140 integrates the determination result by the position estimation/determination unit 144 and the diagnosis result by the travel status diagnosis unit 145 by the integrated determination unit 146 and determines data to be used for position estimation.

For the estimation result of the self-position estimation unit 149 to be described later, the position estimation/determination unit 144 determines whether or not global position estimation is successful, by using a point group. Although described in detail later with reference to FIG. 3, whether or not the global position estimation is successful indicates a state where there is no large (for example, a meter-level) position error in the self-position estimation result and there is no large deviation of a landmark or the like. Whether or not the global position estimation is successful can be determined by, for example, an index such as whether the sum of the distance errors of the corresponding point group at the time of collation is equal to or less than a predetermined value, whether the maximum value of the distance of the corresponding point group at the time of collation is equal to or less than a predetermined value, or whether a difference between an own-vehicle movement amount difference and a self-position estimation difference is equal to or less than a predetermined value, or a combination thereof. A positional deviation may be corrected on the basis of a determination result.

The position estimation/determination unit 144 does not operate due to a non-collation state at the time of the first operation and determines that the global position estimation has failed, and thereafter, refers to the collation result of the self-position estimation unit 149 in the subsequent stage to determine whether the global position estimation is successful, and transmits a determination result to the integrated determination unit 146.

The travel status diagnosis unit 145 diagnoses the travel status by using the travel status 162 at the time of generation of the self-generated map 161 by the self-map generation unit 148 and the past travel status 152 recorded in the recording unit 113. For each point group obtained from each sensor, it is determined whether or not the travel status is a travel status which affects a decrease in accuracy, and a determination result is transmitted to the integrated determination unit 146. For example, the high point group obtained from the cameras 121 to 124 via the landmark detection unit 142 has a property that the accuracy decreases when the speed of the vehicle 105 increases, and it is determined whether or not the speed at the time of map generation is equal to or higher than a predetermined speed.

In addition, for example, in the case of the stereo camera 125, considering the relationship between the angle of view of the stereo camera and the observation distance, when the travel status 162 is a vehicle behavior, such as a turning-back operation, which greatly changes an observation direction in a short time, the observation target is changed from that at the time of map generation, which may cause noise at the time of point group collation and decrease the accuracy. However, even in the turning-back operation, when the movement of the vehicle is equivalent to that at the time of map generation, there is no large difference between that at the time of past map generation and the current observation point group, so that a decrease in accuracy is small.

In addition, for example, in the case of the sonar 126, the density of the point group changes when the speed changes, and thus, in a case where the speed is different from that at the time of map generation, this causes a decrease in accuracy. Not limited to this example, in consideration of the property of the point group obtained from each sensor, whether or not a condition is satisfied is determined for the vehicle behavior regarding the property.

The integrated determination unit 146 integrally determines a state from the determination result of the position estimation/determination unit 144 and the diagnosis result of the travel status diagnosis unit 145, and determines the point group data to be selected for improving the accuracy. A determination method based on the determination result of the position estimation/determination unit 144 and the diagnosis result of the travel status diagnosis unit 145 will be described with reference to FIG. 5. The integrated determination unit 146 transmits the determination result to the data selection unit 147.

The integrated diagnosis unit 140 is a functional block in which diagnosis functions including the position estimation/determination unit 144, the travel status diagnosis unit 145, and the integrated determination unit 146 are integrated. This configuration is merely an example, and for example, the integration diagnosis unit may be configured only by the position estimation/determination unit 144, may be configured only by the travel status diagnosis unit 145, or may be configured by another diagnosis method. Note that an example of determination elements in a case where the integrated diagnosis unit 140 is configured only by the position estimation/determination unit 144 will be described with reference to FIG. 6.

The data selection unit 147 selects point group data for each sensor on the basis of the diagnosis result of the integrated diagnosis unit 140, and transmits the point group data to the self-position estimation unit 149.

The self-position estimation unit 149 collates the self-generated map 161 obtained from the self-map generation unit 148 in a status during current travel with the self-generated map 151 generated in the past and stored in the recording unit 113 to estimate the self-position on the self-generated map 151. The point group used for the collation is the point group transmitted from the data selection unit 147. For example, an iterative closest point (ICP) algorithm which is a known point group matching technique can be used for the collation. Accordingly, a coordinate conversion amount from the self-generated map 161 during current travel to the self-generated map 151 generated in the past can be calculated, and the self-position on the self-generated map 151 can be estimated from the current position of the vehicle on the self-generated map 161 subjected to the coordinate conversion. A processing flow of the self-position estimation unit 149 will be described later with reference to FIG. 8.

The success or failure of the global position estimation will be described with reference to FIG. 3. FIGS. 3(*a*) and 3(*b*) illustrate a state before successful global position estimation, and FIG. 3(*c*) illustrates a state after the successful global position estimation. The point group 302 of the self-generated map 161 observed currently and generated while traveling is collated with the point group 301 of the past self-generated map 151 recorded in the recording unit 113, for example, by using the ICP algorithm or the like, so as to estimate the estimated self-position 303. As illustrated in FIG. 3(*b*), there is a state in which both the local position estimation in a narrow range and the global position estimation in a wide range are not successful. In addition, as illustrated in FIG. 3(*a*), due to factors such as an initial collation position at which the ICP algorithm is started or slid but similar point group arrangement, the global position estimation in the wide range is in the state of not being successful even when the local position estimation in the narrow range is successful, and due to deviation from the original point group position, self-position estimation may be erroneously performed as a result. In addition, although the ICP algorithm operates to minimize the sum of the distance errors between the corresponding point groups, depending on the initial collation position at which the ICP algorithm is started, the collation may fail overall, the point group may be collated with a position having the smallest error among the peripheral positions, and the self-position estimation may be erroneously performed.

In a case where the global position estimation is successful, a position estimation error remains to some extent (for example, about several tens of centimeters) due to the use of a point group in a wide range, that is, a far point group, but there is no error at a meter level, and a correct position can be estimated to some extent as illustrated in FIG. 3(*c*). The position estimation/determination unit 144 determines whether or not the global position estimation is successful from the state of the point group or the like. A state as to whether or not the global position estimation is successful is output.

Figure 4:
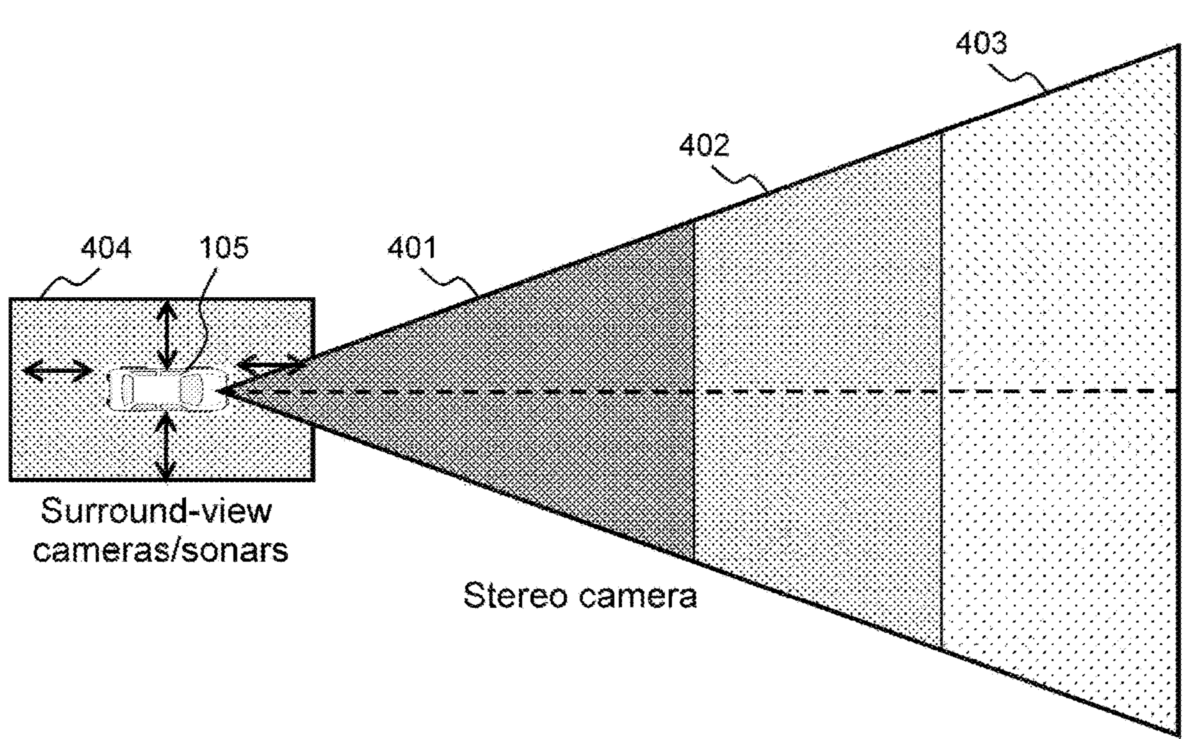
FIG. 4 is a diagram illustrating attachment states of cameras, a stereo camera, and a sonar, and division of observation ranges.

FIG. 4 is a diagram illustrating the attachment states of the cameras 121 to 124, the stereo camera 125, and the sonar 126 and the division of observation ranges.

The stereo camera 125 has a narrow angle of view and can observe a relatively far observation ranges 401 to 403. The cameras 121 to 124 and the sonar 126 are attached around the vehicle 105, and observe an observation range 404 in a relatively close vicinity. The attachment position and the observation range of each sensor are examples. The cameras 121 to 124 and the stereo camera 125 observe the road surface point group and the high point group. The point group observed by the cameras 121 to 124 and the stereo camera 125 has a property of high accuracy in the vicinity of the vehicle 105 and low accuracy in the distance from the vehicle 105 in both the road surface point group and the effective point group. Therefore, in order to improve the self-position estimation accuracy, the self-position estimation using the point group observed near the vehicle 105 is desirable. However, when the self-position is estimated by using only the point group observed near the vehicle 105, the global position estimation may fail as illustrated in FIGS. 3(*a*) and 3(*b*).

On the other hand, when the far point is also used, the collation is corrected overall, and as illustrated in FIG. 3(*c*), the possibility of successful global position estimation is increased. Therefore, it is desirable to perform the self-position estimation by using far points before the global position estimation and removing far points with poor accuracy and using near points after the global position estimation.

Since the stereo camera 125 can observe relatively far, division may be made into the near point group 401, the middle point group 402, and the far point group 403, and the point groups may be selectively used according to the determination result of the integrated determination unit 146. This is an example, and the division may not be made into three.

In addition, in the road surface point group and the high point group, the road surface point group has higher accuracy in both the cameras 121 to 124 and the stereo camera 125, and thus, this is taken into consideration when the point groups are selectively used in determination by the integrated determination unit 146.

In the stereo camera 125, the observation point groups may be roughly divided into a near road surface point group, a middle road surface point group, a far road surface point group, a near high point group, a middle high point group, and a far effective point group. In the cameras 121 to 124, the observation range is narrow and thus may be distinguished between the road surface point group and the high point group instead of being divided by a distance. This is an example, and the cameras 121 to 124 may also be divided by a distance to be selectively used by the integrated determination unit 146. Also in this case, both the road surface point group and the effective point group have a property that the closer the distance from the vehicle 105, the higher the accuracy. The point group obtained from the sonar 126 is the high point group, but a line label and a point label are assigned to the effective point group, and thus the effective point group of the line label and the effective point group of the point label may be selectively used by the integrated determination unit 146.

FIG. 5 is a diagram illustrating an example of determination elements of the integrated determination unit 146.

On the basis of the success or failure of the global position estimation determined by the position estimation/determination unit 144 and the travel state determined by the travel status diagnosis unit 145, a point group to be selected is determined for each sensor. FIG. 5(*a*) illustrates determination elements regarding the stereo camera 125, FIG. 5(*b*) illustrates determination elements regarding the cameras 121 to 124, and FIGS. 5(*c*) and 5(*d*) illustrate determination elements regarding the sonar 126.

In the determination regarding the stereo camera 125 illustrated in FIG. 5(*a*), a decrease in accuracy is likely to occur due to a movement such as the turning-back operation, but when the travel status 152 at the time of map generation and the travel status 162 during current travel are the same, a decrease in accuracy is less likely to occur. Therefore, a travel trajectory difference between the travel status 152 at the time of map generation and the travel status 162 during current travel is distinguished between a case where the travel trajectory difference is smaller than a predetermined value and a case where the travel trajectory difference is larger than the predetermined value. In general, the trajectory difference decreases during straight travel, and the trajectory difference increases during travel in which straight lines and curved lines are mixed. The travel trajectory difference may be divided into sections by a predetermined distance or time of the travel trajectory, and the difference of the trajectory may be determined for each divided section. In addition, when a wide range of points are used in order not to erroneously perform the global position estimation before the global self-position estimation, and only highly accurate points are used to locally estimate a position after the global self-position estimation, it is possible to perform highly accurate position estimation. In view of these, in the case with a small travel trajectory difference and before the global position estimation, the near, middle, and far high point groups and the near, middle, and far road surface point groups are selected, in the case with a small travel trajectory difference and after the global position estimation, the near high point group and the near road surface point group are selected, in the case with a large travel trajectory difference and before the global position estimation, the near and middle high point groups and the near and middle road surface point groups are selected, and in the case with a large travel trajectory difference and after the global position estimation, the near road surface point group is selected.

In the determination regarding the cameras 121 to 124 illustrated in FIG. 5(*b*), in a case where a speed is high, the accuracy of the high point group decreases due to the property of motion stereo. The road surface point group is not affected by the speed, and has higher accuracy than the high point group. In addition, when a wide range of points are used in order not to erroneously perform the global position estimation before the global self-position estimation, and only highly accurate points are used to locally estimate a position after the global self-position estimation, it is possible to perform highly accurate position estimation. In view of these, in the case with a low speed and before the global position estimation, the high point group and the road surface point group are selected, in the case with a low speed and after the global position estimation, only the road surface point group is selected, in the case with a high speed and before the global position estimation, only the road surface point group is used, and in the case with a high speed and after the global position estimation, only the road surface point group is used.

In the determination regarding the sonar 126 illustrated in FIGS. 5(*c*) and 5(*d*), when a speed difference between the travel status 152 at the time of map generation and the travel status 162 during current travel is large, the density of the point group changes, and the accuracy decreases. However, lines are hardly affected by the change in density. In addition, in the case of the sonar 126, the accuracy does not greatly vary depending on the observation distance. In view of these, in the case with a small speed difference and before the global position estimation, the points and the lines are selected, in the case with a small speed difference and after the global position estimation, the points and the lines are selected, in the case with a large speed difference and before the global position estimation, the lines are selected, and in the case with a large speed difference and before the global position estimation, the lines are selected. In addition, the sonar 126 is a sensor using a sound wave, and thus the accuracy fluctuates due to a temperature change. Therefore, in the case with a small temperature difference and before the global position estimation, the points and the lines are selected, in the case with a small temperature difference and after the global position estimation, the points and the lines are selected, in the case with a large temperature difference and before the global position estimation, the lines are selected, and in the case with a large temperature difference and before the global position estimation, the lines are selected.

These determination methods are examples, and other combinations and point group selections may be set according to the usage. In addition, the travel status may also include a weather condition, a sunshine condition, or the like. In addition, the stages of classifying determination conditions are not limited to two stages, and may be three or more stages.

FIG. 6 is a diagram illustrating an example of determination elements of the integrated diagnosis unit 140, and illustrates an example of the determination elements in a case where the integrated diagnosis unit 140 includes only the position estimation/determination unit 144.

In a case where the integrated diagnosis unit 140 includes only the position estimation/determination unit 144, a point group to be selected is determined for each sensor on the basis of only success or failure of the global position estimation determined by the position estimation/determination unit 144. FIG. 6(*a*) illustrates determination elements regarding the stereo camera 125, FIG. 6(*b*) illustrates determination elements regarding the cameras 121 to 124, and FIG. 6(*c*) illustrates determination elements regarding the sonar 126. In FIGS. 6(*a*), 6(*b*), and 6(*c*), a wide range of points are utilized before the global position estimation, and only points with high accuracy are utilized after the global position estimation.

FIG. 7 is a flowchart illustrating the operation of the self-map generation unit 148. When receiving an execution command from the landmark detection unit 142 and the point group generation unit 143, the self-map generation unit 148 executes the following operation. An execution subject of each step described below is the CPU 110.

In a landmark acquisition step 701, the landmark detection unit 142 acquires, from the RAM 112, the road surface point group generated from the outputs of the cameras 121 to 124 and the stereo camera 125. The road surface point group is represented by each sensor coordinate system. The process proceeds to the next step 702.

In a point group acquisition step 702, the high point group of each sensor generated by the point group generation unit 143 is acquired from the RAM 112. The high point group is represented by each sensor coordinate system. The process proceeds to the next step 703.

In a coordinate conversion step 703, the coordinate system of the road surface point group acquired in the landmark acquisition step 701 and the high point group acquired in the point group acquisition step 702 is converted into the coordinate system of the vehicle 105. For the conversion, the sensor parameter 150 for each sensor stored in the ROM 111 is used. The point group subjected to the coordinate conversion is output to a map generation step 704, and the process proceeds to the next step 704.

In the map generation step 704, by using the vehicle motion information obtained from the odometry estimation unit 141, the coordinate point group obtained in the coordinate conversion step 703 is converted into world coordinates, and combined with the point group map of the previous time stored in the RAM 112, so as to self-generate the point group map in time series. The self-generated map and the travel status such as a vehicle speed, a steering angle, vehicle motion information, and a vehicle motion trajectory obtained by integrating vehicle motion, which are obtained from the odometry estimation unit 141, are output to a point group map output step 705, and the process proceeds to the next step 705.

In the point group map output step 705, the point group map generated in the map generation step 704 is output as the self-generated map 161 to the RAM 112 or as the self-generated map 151 to the recording unit 113. Similarly, the travel status obtained from the map generation step 704 is output as the travel status 162 to the RAM 112 or as the travel status 152 to the recording unit 113, and the processing ends. In the case of the map generation mode 202, basically, the self-generated map 161 and the travel status 162 are output to the RAM 112, and then the sensor value acquisition unit 201 acquires a sensor value. In a case where an instruction to record a map is received from the user via the interface 180, the point group map generated in the map generation step 704 is output as the self-generated map 151 and the travel status 152 to the recording unit 113, and the processing ends. In the case of the self-position estimation mode 203, the position estimation/determination unit 144 and the travel status diagnosis unit 145 start processing.

Figure 8:
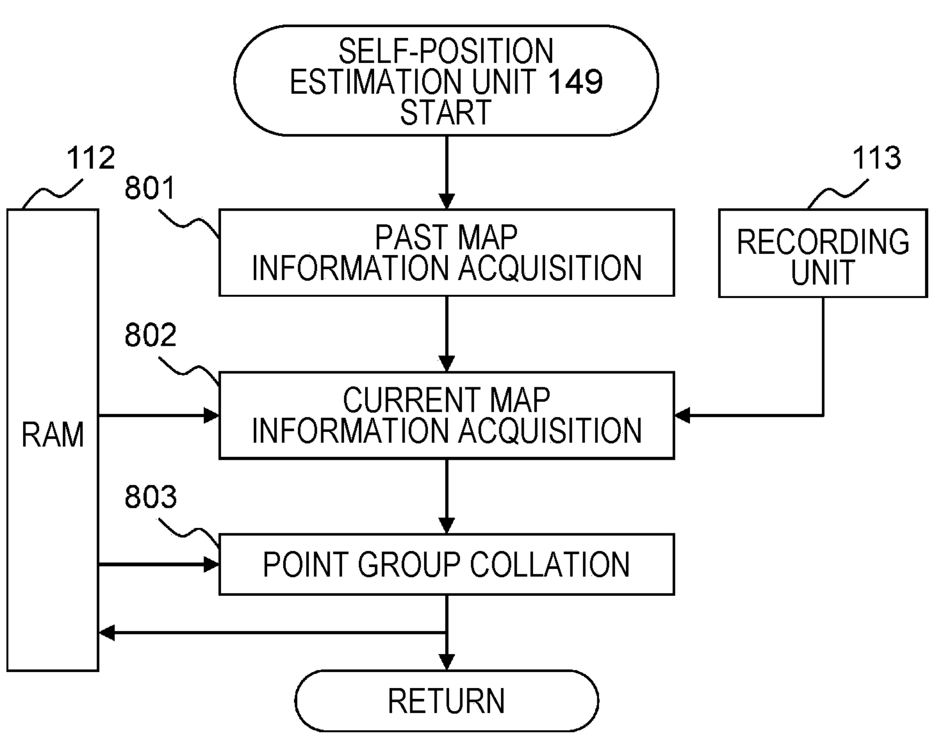
FIG. 8 is a flowchart illustrating an operation of a self-position estimation unit.

FIG. 8 is a flowchart illustrating the operation of the self-position estimation unit 149. When receiving an execution command from the data selection unit 147, the self-position estimation unit 149 executes the following operation. An execution subject of each step described below is the CPU 110. This processing is executed only in the self-position estimation mode 203.

In a past map information acquisition step 801, the self-generated map 151 stored in the recording unit 113 is acquired. The self-generated map 151 is a map acquired through past travel. The process proceeds to the next step 802.

In a current map information acquisition step 802, the selected point group of the self-generated map 161 which is determined by the integrated determination unit 146 to be selected by the data selection unit 147 and observed during current travel is acquired from the RAM 112. The process proceeds to the next step 803.

In a map collation step 803, the self-position on the past self-generated map 151 is calculated from the past self-generated map 151, which is acquired in the past map information acquisition step 801 and the self-generated map 161, which is acquired in the current map information acquisition step 802 and observed during current travel, by collation with the point group selected by the integrated determination unit 146 and the data selection unit 147 from the viewpoint of improving the accuracy. For example, an iterative closest point (ICP) algorithm which is a known point group matching technique can be used for the collation of the point group. In the ICP algorithm, a correspondence between points is calculated, and processing of minimizing a distance error in the calculated correspondence is repeated to collate point groups with each other. By the collation between the maps, it is possible to calculate the coordinate conversion amount for converting the self-generated map 161 obtained from the self-map generation unit 148 onto the self-generated map 151, and to obtain the self-position on the self-generated map 151 from the current position of the vehicle subjected to the coordinate conversion. The self-position on the self-generated map 151 is output, and the processing illustrated in FIG. 8 ends. After the end, the sensor value acquisition unit 201 starts processing.

Second Embodiment

Hereinafter, a second embodiment of the present invention will be described. In the second embodiment, differences from the first embodiment described above will be mainly described, and the same configurations and processing as those in the first embodiment will be denoted by the same reference numerals, and description thereof will be omitted.

Figure 9:
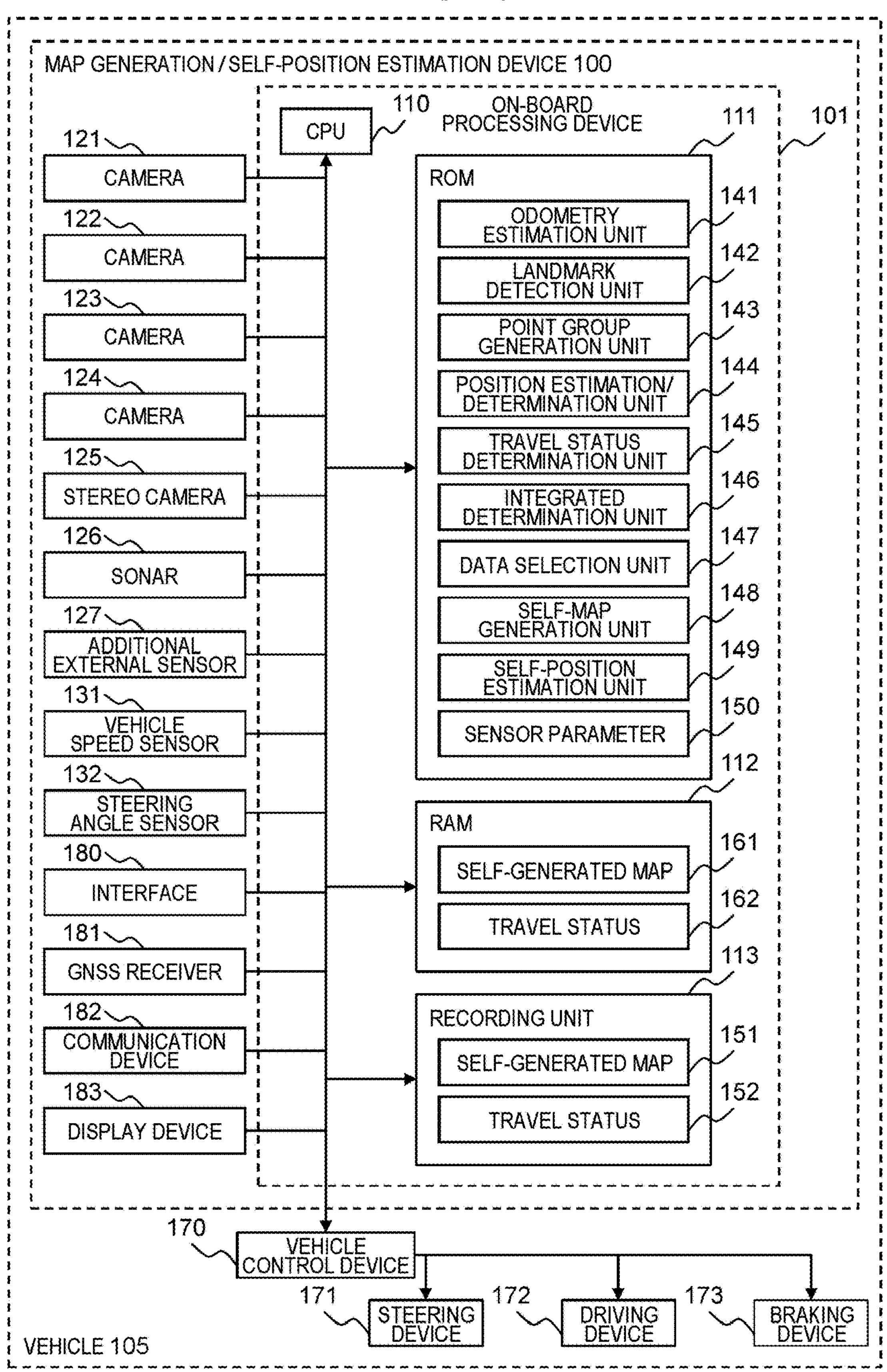
FIG. 9 is a block diagram illustrating a configuration of a vehicle according to a second embodiment.

FIG. 9 is a block diagram illustrating a configuration of the vehicle 105 according to the second embodiment of the present invention.

The vehicle 105 includes the map generation/self-position estimation device 100 and a vehicle control device group 170 to 173 that controls autonomous driving in the vehicle 105. The map generation/self-position estimation device 100 includes the cameras 121 to 124, the stereo camera 125, the sonar 126, the additional external sensor 127, the vehicle speed sensor 131, the steering angle sensor 132, the interface 180, a GNSS receiver 181, a communication device 182, and a display device 183. The cameras 121 to 124, the stereo camera 125, the sonar 126, the additional external sensor 127, the vehicle speed sensor 131, the steering angle sensor 132, the interface 180, the GNSS receiver 181, the communication device 182, the display device 183, and the vehicle control device group 170 to 173 are connected to the on-board processing device 101 via signal lines, and exchange various types of data with the on-board processing device 101.

The GNSS receiver 181 receives signals transmitted from a plurality of satellites configuring a satellite navigation system (for example, GPS), and calculates the position of the GNSS receiver 181, that is, a latitude and a longitude by calculation using the received signals. Note that the accuracy of the latitude and the longitude calculated by the GNSS receiver 181 may be low, and for example, an error of about several meters to 10 meters may be included. The GNSS receiver 181 outputs the calculated latitude and longitude to the on-board processing device 101.

The communication device 182 is a communication device used for wirelessly exchanging information between a device outside the vehicle 105 and the on-board processing device 101. For example, when the user is outside the vehicle 105, the communication device exchanges information by communicating with a mobile terminal worn by the user. The target with which the communication device 182 communicates is not limited to the mobile terminal of the user, and may be a device which provides data regarding the autonomous driving.

The display device 183 is, for example, a liquid crystal display, and displays the information output from the on-board processing device 101.

The vehicle control device 170 controls at least one of a steering device 171, a driving device 172, and a braking device 173 on the basis of the information output from the on-board processing device 101, for example, the current self-position on the self-generated map 151 output from the self-position estimation unit 149. The steering device 171 operates the steering of the vehicle 105. The driving device 172 applies a driving force to the vehicle 105. The driving device 172 increases or decreases the driving force of the vehicle 105 by increasing or decreasing the target rotation speed of an engine or a motor included in the vehicle 105, for example. The braking device 173 applies a braking force to the vehicle 105 to decelerate the vehicle 105.

In the vehicle 105, the on-board processing device 101 may store the self-generated map 151, which is stored in the recording unit 113, in a server or the like via the communication device 182. In addition, the on-board processing device 101 may be mounted on another vehicle 105 and store the self-generated map 151, which is stored in the server, in the recording unit 113 via the communication device 182, and utilize the self-generated map for self-position estimation. Furthermore, the on-board processing device 101 may attach the reception position of the GNSS receiver 181 at each time to the self-generated map 161, and when the self-position estimation is performed, search for a map attached with a value close to the position information based on the current GNSS to select a map to be collated. When a GNSS signal cannot be received, the odometry estimation unit 141 may estimate an absolute position from a difference from the absolute position observed by the GNSS most recently.

Figure 10:
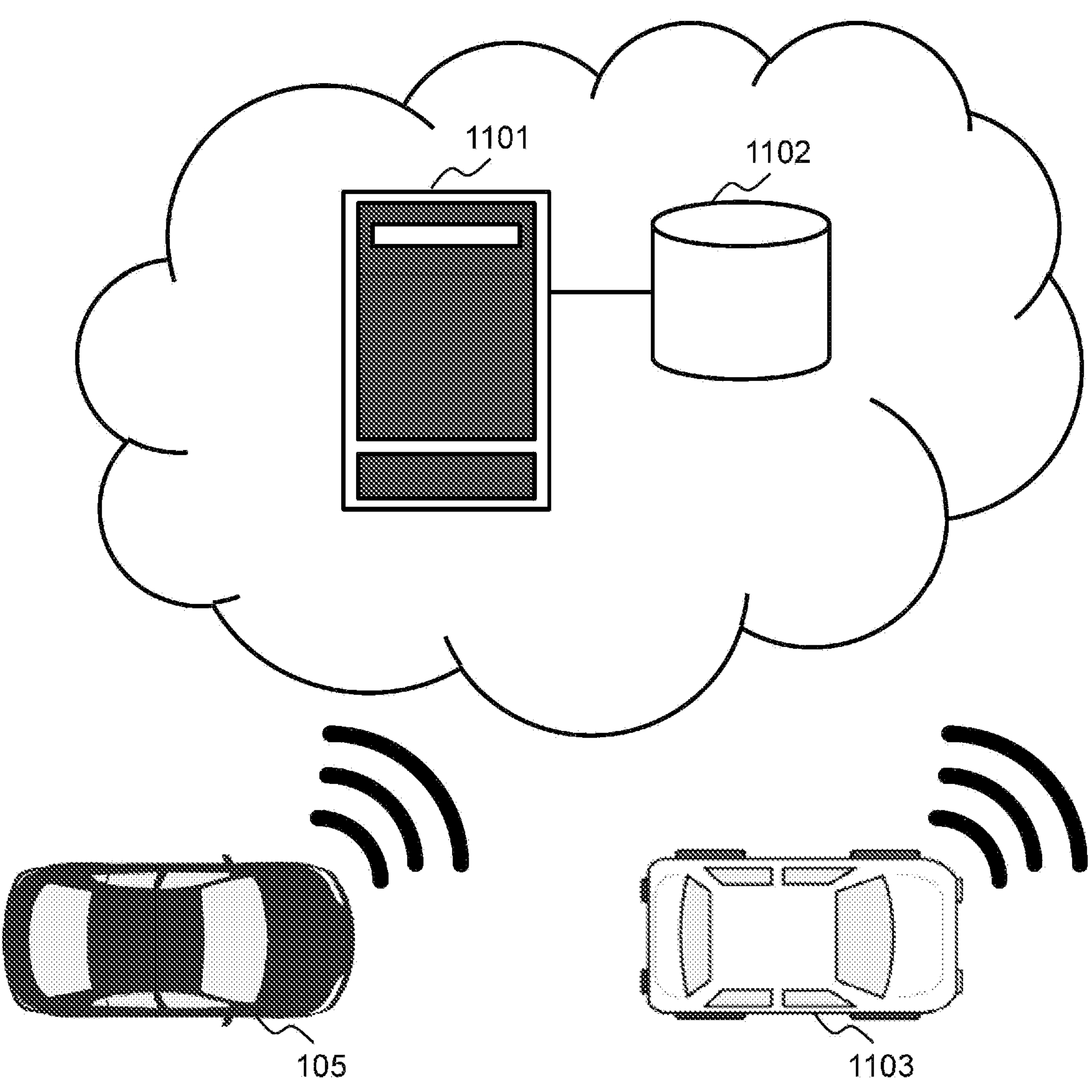
FIG. 10 is a diagram illustrating map sharing by a map generation/self-position estimation device.

FIG. 10 is a diagram illustrating map sharing by the map generation/self-position estimation device 100.

The own vehicle 105 and another vehicle 1103 each include the map generation/self-position estimation device 100 having the communication device 182. By using the communication device 182, the own vehicle 105 records the self-generated map 151 and the travel status 152 via a communication line in an external recording device 1102 connected to a server 1101 on a cloud. By using the communication device 182, the other vehicle 1103 acquires the self-generated map 151 and the travel status 152 generated by the vehicle 105 from the external recording device 1102 connected to the server 1101 on the cloud, and utilizes the self-generated map as the map of the other vehicle 1103. In addition, the self-generated map 151 and the travel status 152 generated by the other vehicle 1103 may be utilized by the own vehicle 105.

As described above, the on-board processing device 101 of the present embodiment includes the past map storage unit (recording unit 113) that stores a past generated map generated in the past, the self-map generation unit 148 that generates a traveling map on the basis of sensor data acquired while traveling, the self-position estimation unit 149 that estimates a self-position by collating the past generated map and the traveling map, and the data selection unit 147 that selects the data, to be used by the self-position estimation unit 149, from the traveling map on the basis of characteristics of data included in the traveling map. Therefore, it is possible to estimate the self-position with high accuracy by selecting an optimal point group and estimating the self-position in consideration of the accuracy of the point group generated from the image captured by the camera and the occurrence of local adaptation at the time of position estimation using the point group.

In addition, the self-position estimation unit 149 can execute first collation (global collation) in which a collation range between the past generated map and the traveling map is wide and second collation (local collation) in which the collation range is narrow, and the data selection unit 147 selects different data between the first collation and the second collation. Therefore, the self-position can be estimated with high accuracy by the global collation which includes a far point and reduces an error overall and the local collation which uses points having high sensing accuracy.

In addition, since the self-position estimation unit 149 executes the second collation after the first collation, it is possible to prevent erroneous estimation of the self-position due to the local collation before the global collation, and to estimate the self-position with high accuracy.

In addition, the system includes the integrated determination unit 146 that specifies the type of data to be used for position estimation on the basis of a travel status at the time of map generation and the estimation result of the self-position, and the travel status includes a travel status at the time of generating the past generated map and a current travel status, so that the estimation accuracy of the self-position can be improved.

In addition, the self-map generation unit 148 generates a traveling map converted into absolute coordinates estimated by GNSS and odometry, and is further connected via a communication line to the server 1101 that stores a map, and transmits the traveling map to the server 1101 to be usable by the other vehicle 1103, and uses a map generated by the other vehicle 1103 as the past generated map. Therefore, many vehicles can share maps, and a wide range of maps can be used.

In addition, the self-position estimation unit 149 outputs the estimated self-position to the vehicle control device 170, and the vehicle control device 170 controls at least one of the steering device 171, the driving device 172, and the braking device 173 on the basis of the self-position output from the on-board processing device 101. Therefore, it is possible to realize autonomous driving and driving support on the basis of a self-generated map.

Note that the present invention is not limited to the above-described embodiments, and includes various modifications and equivalent configurations within the spirit of the appended claims. For example, the above-described embodiments have been described in detail for easy understanding of the present invention, and the present invention is not necessarily limited to those having all the described configurations. Other embodiments considered within the scope of the technical idea of the present invention are also included within the scope of the present invention. In addition, some of the configurations of one embodiment may be replaced with the configurations of another embodiment. In addition, the configuration of one embodiment may be added with the configuration of another embodiment. In addition, addition, deletion, and replacement of other configurations may be performed on some of the configurations of each embodiment.

In addition, the map generation/self-position estimation device 100 may include an input/output interface (not illustrated), and if needed, a program may be read from another device via the input/output interface and an available medium. The medium is, for example, a storage medium detachable from the input/output interface, or a communication medium, that is, a wired, wireless, or optical network, or a carrier wave or a digital signal propagating through the network.

In addition, some or all of the above-described configurations, functions, processing units, processing means, and the like may be realized with hardware by, for example, designing with an integrated circuit, or may be realized with software by a processor interpreting and executing a program for realizing each function. In addition, some or all of the functions realized by the program may be realized by a hardware circuit or an FPGA.

Information such as a program, a table, and a file for realizing each function can be stored in a storage device such as a memory, a hard disk, or a solid state drive (SSD), or a recording medium such as an IC card, an SD card, or a DVD.

In addition, control lines and information lines are illustrated in consideration of necessity for the description, and not all control lines and information lines necessary for implementation are illustrated. In practice, it may be considered that almost all configurations are connected to each other.

The invention claimed is:

1. A vehicle control device comprising a processor configured to:

record a past generated map generated in the past and a traveling map generated based on sensor data acquired while a vehicle is traveling, the traveling map including first point group data, wherein the first point group data includes road surface point group data representing a road marking displayed on a road surface and high point group data representing an elevated feature having a height above the road surface;

execute first collation to collate past point group data included in the past generated map with the road surface point group data and collate the past point group data with the high point group data;

execute first self-position estimation to estimate a self-position of the vehicle based on a result of the first collation;

in response to a determination that the road surface point group data has higher accuracy compared with the high point group data, estimate the self-position of the vehicle based on a result of second collation to collate the past point group data with second point group data, wherein the second point group data is a subset of the road surface point group data, the subset selected from the past point group data and the first point group data; and control, based on the estimated self-position of the vehicle, at least one of a steering device, a driving device, or a braking device of the vehicle.

2. A vehicle control device comprising a processor configured to:

record i) a traveling map generated based on sensor data acquired while a vehicle is traveling and ii) travel status data including a first travel status at a time of generation of a past generated map, wherein the travel status data represents a vehicle operating condition and an environmental condition that affect sensor accuracy;

execute first self-position estimation to estimate a self-position of the vehicle based on a result of first collation to collate past point group data included in the past generated map with first point group data included in the traveling map, the first point group data including road surface point group data representing a road marking displayed on a road surface and high point group data representing an elevated feature having a height above the road surface;

in response to a determination that the road surface point group data has higher accuracy compared with the high point group data, select a subset of the road surface point group data, as second point group data, from the first point group data based on the first travel status at the time of generation of the past generated map and a second travel status at a time of generation of the traveling map;

estimate the self-position of the vehicle based on a result of second collation to collate the past point group data included in the past generated map with the second point group data; and control, based on the estimated self-position of the vehicle, at least one of a steering device, a driving device, or a braking device of the vehicle.

3. The vehicle control device according to claim 2, wherein the processor is further configured to execute the second collation after the first collation.

4. The vehicle control device according to claim 2, wherein the processor is further configured to:

specify a type of data to be used for position estimation based on an estimation result of the self-position.

5. The vehicle control device according to claim 4, wherein the travel status data includes a current travel status.

6. The vehicle control device according to claim 1, wherein the processor is configured to: generate the traveling map converted into absolute coordinates estimated by a GNSS and odometry.

7. The vehicle control device according to claim 6, wherein connection is made via a communication line to a server that stores a map, the traveling map is transmitted to the server configured to be accessed by another vehicle, and the server is configured to receive a map generated by the other vehicle and use the map as the past generated map.

8. The vehicle control device according to claim 1, wherein the processor is further configured to output the estimated self-position to at least one of the steering device, the driving device, or the braking device of the vehicle.

9. A self-position estimation method for estimating a self-position by an on-board processing device, the method comprising:

recording a past generated map generated in the past and a traveling map generated based on sensor data acquired while a vehicle is traveling, the traveling map including first point group data, wherein the first point group data includes road surface point group data representing a road marking displayed on a road surface and high point group data representing an elevated feature having a height above the road surface;

executing first collation to collate past point group data included in the past generated map with the road surface point group data and collate the past point group data with the high point group data;

executing first self-position estimation to estimate a self-position of the vehicle based on a result of the first collation;

in response to a determination that the road surface point group data has higher accuracy compared with the high point group data, estimating the self-position of the vehicle based on a result of second collation to collate the past point group data with second point group data, wherein the second point group data is a subset of the road surface point group data, the subset selected from the past point group data and the first point group data; and controlling, based on the estimated self-position of the vehicle, at least one of a steering device, a driving device, or a braking device of the vehicle.

* * * * *